E. F. YANGER.
COTTON CHOPPER AND CULTIVATOR.
APPLICATION FILED JULY 3, 1917.

1,258,295.

Patented Mar. 5, 1918.
2 SHEETS—SHEET 1.

Inventor
Edward F. Yanger,
By
Attorney

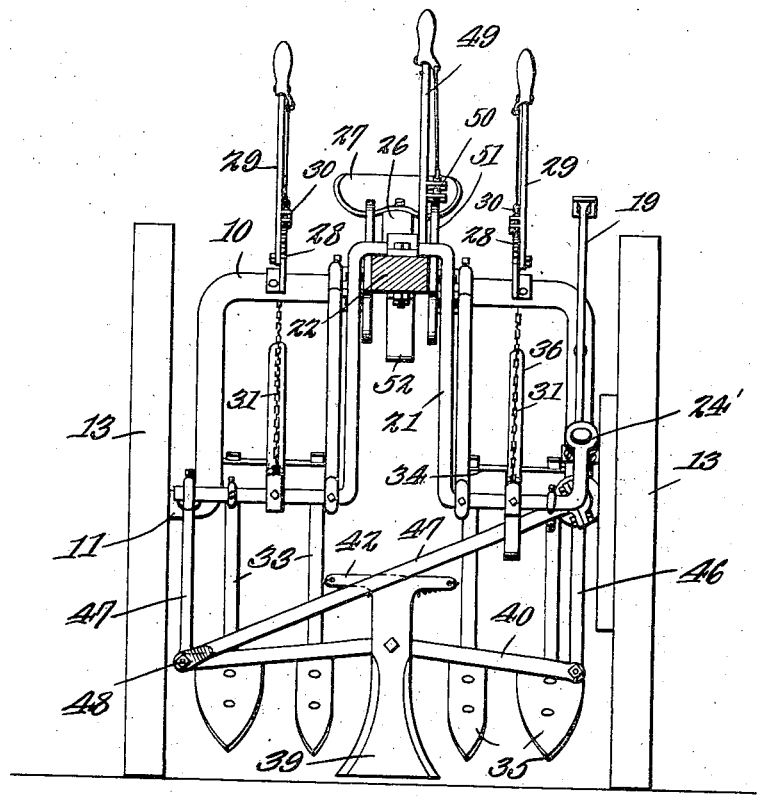

UNITED STATES PATENT OFFICE.

EDWARD F. YANGER, OF FOREMAN, ARKANSAS.

COTTON CHOPPER AND CULTIVATOR.

1,258,295.  Specification of Letters Patent.  Patented Mar. 5, 1918.

Application filed July 3, 1917. Serial No. 178,371.

*To all whom it may concern:*

Be it known that I, EDWARD F. YANGER, a citizen of the United States of America, and resident of Foreman, in the county of Little River and State of Arkansas, have invented certain new and useful Improvements in Cotton Choppers and Cultivators, of which the following is a specification.

This invention relates to agricultural implements and particularly to cotton choppers and cultivators.

An object of this invention is to provide novel means whereby cotton is chopped or cut at predetermined distances throughout the length of a row while at the same time the standing stalks are cultivated and the earth or soil is agitated as is ordinarily done in the production of crops of cotton.

A further object of this invention is to provide novel means for operating the chopper associated with novel means for controlling the chopper driving mechanism.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Fig. 3 illustrates a sectional view on the line 3—3 of Fig. 1;

Fig. 4 illustrates a plan view of the chopper controlling or holding means; and

Fig. 5 illustrates a detail sectional view of power transmitting elements.

Figure 1:
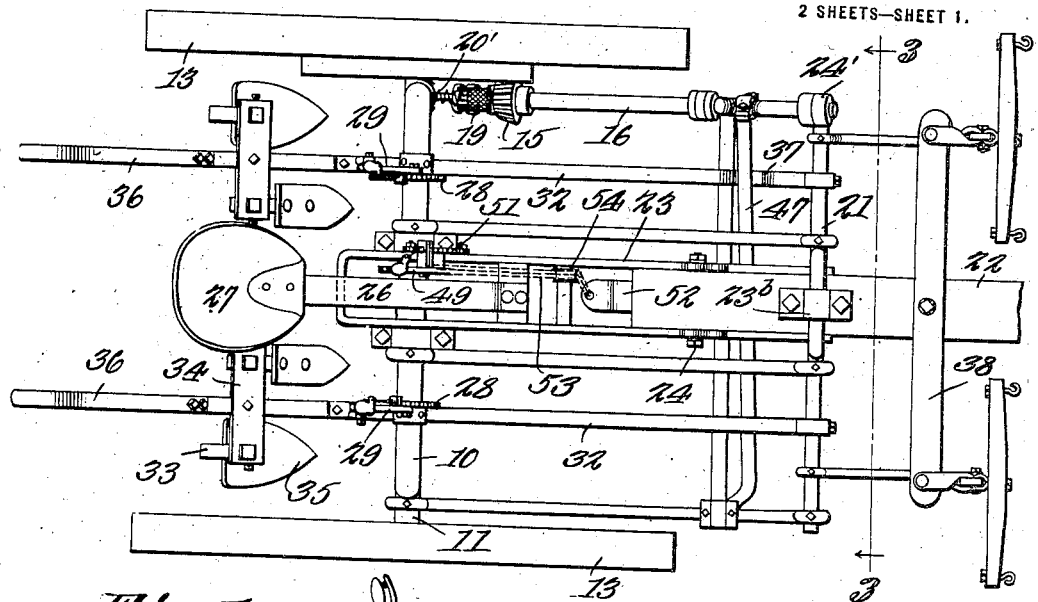
Figure 1 illustrates a plan view of a combined cultivator and chopper embodying the invention.
Figure 2:
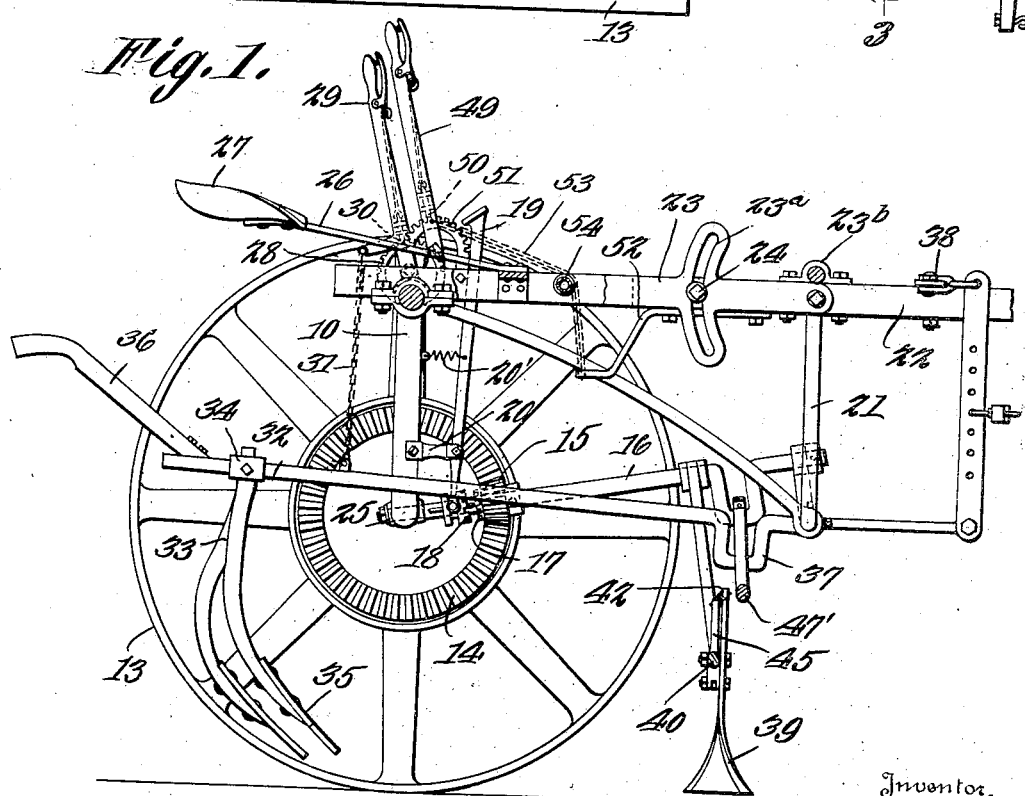
Fig. 2 illustrates a longitudinal vertical sectional view thereof.

In these drawings 10 denotes the main arch frame terminating in spindles 11 for the wheels 13. One of the wheels carries a gear wheel 14 with which a pinion 15 meshes, the said pinion being free to rotate on a crank shaft 16. A clutch member 17 is formed as a part of the pinion and a clutch member 18 is splined on the crank shaft and is moved into operative relation with the clutch member 17 by a lever 19, which lever is pivoted on a bracket 20 carried by the frame 10. The clutch is held normally out of engagement by the spring 20' connected to the lever and to the frame 10. An auxiliary ratchet frame 21 is supported on the tongue 22 and the tongue is connected to the frame 10 in any appropriate manner but preferably by means of the U-shaped plate 23 which embraces the sides of the tongue and the plate and tongue are fastened together by a bolt 24.

The auxiliary frame 21 terminates in a bearing 24' in which one end of the crank shaft 16 is journaled and the opposite end of the crank shaft is journaled in a bearing 25 carried by the frame 10. A seat support 26 is connected to the plate 23 and the said seat support has a seat 27 on its end. Toothed segments 28 are supported on the frame 10 and levers 29 are pivotally supported in operative relation to these segments, the said levers having detents 30 which engage the teeth of the segments so that the levers are held at different positions of adjustment. The levers have flexible members 31 connected to them and the said flexible members are connected to plow beams 32 to which the standards 33 are adjustably connected by the fastenings 34 and the said standards carry shovels 35 which are designed for the cultivation of the cotton. The beams have handles 36 for guiding the plows or otherwise manipulating the same. The forward ends of the beams are pivoted on the auxiliary frame 21 and one of the said beams has an offset portion 37 which produces a clearance for a pitman to be presently described.

Any suitable draft rigging 38 may be applied to the tongue or frame, but one embodiment of a draft rigging is here shown, although the details of construction thereof need not, it is thought, be described.

The plate 23 has a segmental slot 23ª in which the bolt 24 is adjustable for holding the tongue at different positions of adjustment, it being shown that the said tongue is hung or supported from the auxiliary frame by a bearing 23ᵇ which is fastened to the tongue and is pivoted on the said auxiliary frame.

The cotton chopping blade 39 is attached to a bar 40 by a bolt in a manner to have a slight oscillatory motion and the upper end of the said chopper has a cross head 42 to which the springs 43 and 44 are connected, the said springs being anchored or connected to a post 45 carried by the bar 40, so that the springs operate to hold the chopper yieldingly in a predetermined position, but it permits the chopper to oscillate or partially rotate if it comes in contact with an unyielding surface or object thus permitting the chopper to yield and avoid injury. The bar 40 is pivotally connected to arms 46 and 47 and these arms are pivotally mounted on the auxiliary frame so that they may be moved up and down to permit the chopper to rise and fall during its operation. A pitman 47' is pivotally connected to the bar 40 at 48 and the opposite end of the pitman is connected to the crank shaft 16 so that as the crank shaft is rotated, the pitman is reciprocated and the cotton chopper is moved up and down, and as the operation of the chopper is controlled by the distance of travel of the ground or traction wheels, it follows that the chopper will operate a predetermined distance of travel throughout the row of cotton being cultivated.

A lever 49 is pivoted with relation to the frame 10 and it may be held at different positions of adjustment by a detent 50 which engages the toothed rack 51, said lever being effective to control the position of the arm 52 with which it is connected by the flexible member 53 which operates over a sheave 54. The purpose of this relation of parts is to raise and lower the chopping blade 39, as will be apparent.

I claim

1. In a combined cotton chopper and cultivator, a main frame having wheels, a U-shaped plate carried by the frame, a tongue pivotally mounted between the flanges thereof and secured to the said plate, a supplemental frame carried by the tongue, means for connecting the two frames, a journal bearing formed in one end of the supplemental frame, a crank carried by the main frame and said journal bearing, a chopping blade carried by the supplemental frame, a pitman connecting the crank and chopping blade, and means for rotating the crank to operate the said chopping blade.

2. In a combined cotton chopper and cultivator, a main frame, a U-shaped plate carried thereby, a tongue mounted between the flanges thereof, a supplemental frame supported by the tongue, means for connecting the frames, arms swingingly mounted on certain of said means, a chopper blade, links connecting the swingingly mounted arms and chopper blade, a crank journaled in the bearing formed in the supplemental frame and in the main frame, and a pitman connecting the crank and swingingly mounted arms, whereby as the crank is rotated the blade is raised and lowered.

3. In a combined cotton chopper and cultivator, a main frame, a U-shaped plate carried thereby, a tongue mounted between the flanges thereof, a supplemental frame supported by the tongue, means for connecting the frames, a journal bearing formed in one end of the frame, a crank carried by the main frame, and said bearing, arms mounted on the frame connecting means, a chopping blade having a cross head integral therewith, links connecting the said arms, and chopper blade, springs secured to the cross head, and links for returning the blade to normal position, and means for securing the said springs.

EDWARD F. YANGER.